United States Patent
Yule et al.

(10) Patent No.: US 7,619,662 B2
(45) Date of Patent: Nov. 17, 2009

(54) METHOD OF POSITION STAMPING A PHOTO OR VIDEO CLIP TAKEN WITH A DIGITAL CAMERA

(75) Inventors: Andrew T. Yule, East Grinstead (GB); Christopher B. Marshall, Haywards Heath (GB); Simon R. Turner, Redhill (GB)

(73) Assignee: Geotate B.V., Eindhoven (NL)

( * ) Notice: Subject to any disclaimer, the term of this patent is extended or adjusted under 35 U.S.C. 154(b) by 443 days.

(21) Appl. No.: 10/552,049

(22) PCT Filed: Mar. 30, 2004

(86) PCT No.: PCT/IB2004/001000
§ 371 (c)(1),
(2), (4) Date: Oct. 4, 2005

(87) PCT Pub. No.: WO2004/090903
PCT Pub. Date: Oct. 21, 2004

(65) Prior Publication Data
US 2006/0257122 A1    Nov. 16, 2006

(30) Foreign Application Priority Data
Apr. 8, 2003    (GB) ................... 0308054.6

(51) Int. Cl.
*H04N 5/76*    (2006.01)
(52) U.S. Cl. .................................. 348/231.1
(58) Field of Classification Search ............... None
See application file for complete search history.

(56) References Cited

U.S. PATENT DOCUMENTS

| | | | |
|---|---|---|---|
| 5,642,285 A | 6/1997 | Woo et al. | |
| 5,764,770 A * | 6/1998 | Schipper et al. | 713/176 |
| 5,768,640 A * | 6/1998 | Takahashi et al. | 396/310 |
| 5,913,078 A * | 6/1999 | Kimura et al. | 396/50 |
| 6,269,446 B1 | 7/2001 | Schumacher et al. | |
| 6,507,371 B1 * | 1/2003 | Hashimoto et al. | 348/552 |
| 6,741,864 B2 * | 5/2004 | Wilcock et al. | 455/456.1 |
| 6,833,865 B1 * | 12/2004 | Fuller et al. | 348/231.2 |
| 6,914,626 B2 * | 7/2005 | Squibbs | 348/231.3 |
| 7,007,243 B2 * | 2/2006 | Baldino | 715/853 |
| 7,145,695 B2 * | 12/2006 | Endo et al. | 358/2.1 |
| 2002/0047798 A1 * | 4/2002 | Platt | 342/357.12 |

FOREIGN PATENT DOCUMENTS

| | | |
|---|---|---|
| EP | 1 189 021 A1 | 3/2002 |
| JP | 09163276 | 6/1997 |

\* cited by examiner

*Primary Examiner*—Justin P Misleh
(74) *Attorney, Agent, or Firm*—Blakely, Sokoloff, Taylor & Zafman LLP

(57) ABSTRACT

A method of appending a position stamp to an image file of a photo or video clip taken with a digital camera having a GPS antenna and a GPS RF front-end including an analogue to digital converter for receiving GPS signals and outputting GPS signal samples together with a digital camera and computer for the same.

14 Claims, 1 Drawing Sheet

METHOD OF POSITION STAMPING A PHOTO OR VIDEO CLIP TAKEN WITH A DIGITAL CAMERA

BACKGROUND OF THE INVENTION

1. Field of the Invention

This invention relates to a method of appending a position stamp to an image file of a photo or video clip taken with a digital camera having a GPS antenna and a GPS RF front-end including an analogue to digital converter for receiving GPS signals and outputting GPS signal samples; and to a digital camera and computer for the same.

2. Description of Related Art

It is known to provide a digital camera having a GPS receiver wherein image files generated by the digital camera are annotated or labelled with data identifying the position of the camera at the time of capture as determined by the GPS receiver. For example, see U.S. Pat. No. 6,269,446 or European patent application EP1189021A1.

BRIEF SUMMARY OF THE INVENTION

In accordance with the present invention, there is provided a method of the aforementioned type comprising the steps of (i) upon a user taking a photo or video clip: (a) creating an image file containing that photo or video clip, and (b) sampling received GPS signals and storing those GPS signal samples, e.g. in a file format, with an indication of the image file of the photo or video clip to which those GPS signal samples pertain; and (ii) subsequently processing the GPS signal samples to obtain a position fix and appending the position fix to the image file.

The inventors have realised that storing GPS signal samples with an indication of the image file of the photo or video clip to which those GPS signal samples pertain enables those GPS signal samples to be processed at leisure to determine a position fix and, thereafter, append a position stamp to the image file. For example, they may be processed after an intentional delay has elapsed; after the image file and GPS signal samples have been uploaded to an external computer; or upon detecting the connection to the camera of an external power source (either automatically or after user confirmation of an automatic prompt for the same).

In particular, step (i) may be performed twice upon a user taking respective first and second photo or video clips, prior to step (ii) being done for the first photo or video clip.

BRIEF DESCRIPTION OF THE DRAWINGS

The present invention will now be described, by way of example only, with reference to the accompanying FIGURE which shows, schematically, a PC connected to a digital camera including GPS receiver device, both operating in accordance with the present invention.

DETAILED DESCRIPTION OF THE INVENTION

Figure 1:
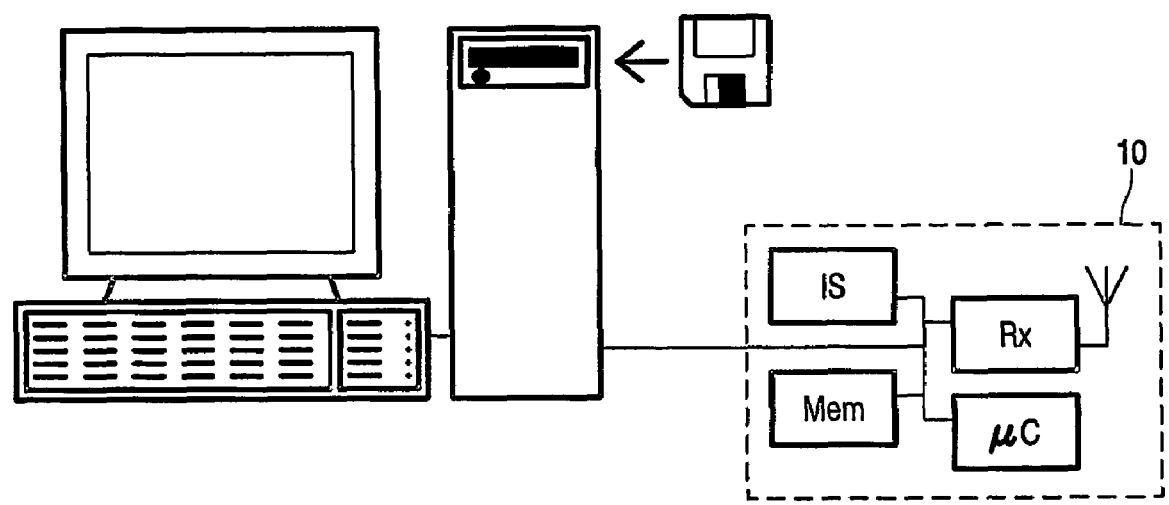

Referring to the accompanying FIGURE, the PC is connected via a USB PC port and corresponding cable to a digital camera 10 which comprises a GPS front-end receiver (Rx) connected to a GPS antenna, an image sensor (IS) and memory (Mem), all under the control of a micro-controller µC.

When operative, the GPS receiver receives NAVSTAR SPS GPS signals through its antenna and pre-process them, typically by passive bandpass filtering in order to minimise out-of-band RF interference, preamplification, down conversion to an intermediate frequency (IF) and analogue to digital conversion. The IF signal remains modulated, still containing all the information from the available satellites. The resultant GPS signal samples are then stored in the memory (Mem).

In accordance with the present invention, the digital camera and PC may generate a position stamped image file as illustrated in any of the following example scenarios:

EXAMPLE 1

Upon a user in possession of the camera taking a photo, an image file containing that photo is created and stored in the memory. At the same time, the GPS receiver receives and samples GPS signals and stores the resultant GPS signal samples in a data file format in the memory together with an indication of the image file to which the GPS signal samples pertain.

Once the user returns home and connects the digital camera to the user's home PC, the image file and corresponding GPS signal samples are uploaded to the PC. The GPS signal samples are then processed using appropriate PC based GPS signal processing software and the PCs more powerful processor to recover pseudorange information from which the position of the digital camera when the corresponding photo was taken can be determined using conventional navigation algorithms. Such GPS signal acquisition and pseudorange processing is well known, for example, see GPS Principles and Applications (Editor, Kaplan) ISBN 0-89006-793-7 Artech House. The position fix is then appended the image file.

EXAMPLE 2

As example 1 except that two or more photos are taken with corresponding image files and GPS signal samples recorded prior to connection with the PC. Upon connection, both sets of GPS signal samples are processed and the position fixes obtained appended to respective image files.

EXAMPLE 3

Instead of the GPS signal processing software being PC based, it may be camera based whereby GPS signal samples are processed only after an intentional delay has elapsed after the image file has been created and the GPS signal samples stored. For example, one might post process the GPS signal samples in slow time, thereby minimising processor power consumption. Similarly, the GPS signal samples might be processed only after detecting the connection of the camera to an external power source.

Whilst the invention has been described in the context of NAVSTAR GPS, the all weather, spaced based navigation system developed and currently operated by the US Department of Defense, it will be appreciated that the invention is equally applicable to other global positioning systems including GLONASS and Galileo and hybrids thereof.

Finally, from a reading of the present disclosure, other modifications will be apparent to persons skilled in the arts of GPS and digital cameras which may involve features which are already known in the design, manufacture and use of GPS receivers, digital cameras and component parts thereof and which may be used instead of or in addition to features already described herein.

The invention claimed is:

1. A method of appending a position stamp to an image file of a photo or video clip taken with a digital camera having a GPS antenna and a GPS RF front-end including an analogue to digital converter for receiving GPS signals and outputting GPS signal samples, the method comprising the steps of:
- (i) upon a user taking a photo or video clip:
  - (a) creating an image file containing that photo or video clip, and
  - (b) sampling received GPS signals and storing those GPS signal samples with an indication of the image file of the photo or video clip to which those GPS signal samples pertain; and
- (ii) subsequently processing the GPS signal samples to obtain a position fix and appending the position fix to the image file.

2. A method according to claim 1 wherein step (ii) is done after an intentional delay has elapsed after step (i).

3. A method according to claim 1 further comprising the step of, after step (i) but before step (ii), uploading the image file and GPS signal samples to an external computer.

4. A method according to claim 1 further comprising the step of, after step (i), detecting the connection to the camera of an external power source whereupon step (ii) is done either automatically or after user confirmation of an automatic prompt for the same.

5. A method according to claim 1 wherein step (i) is performed twice upon a user taking respective first and second photo or video clips, prior to step (ii) being done for the first photo or video clip.

6. A method according to claim 1 wherein the GPS signal samples are stored in a file format.

7. A digital camera comprising:
- a GPS antenna;
- a GPS RF front-end including an analogue to digital converter for receiving GPS signals; said digital camera being configured so that upon a user taking a photo or video clip:
  - (a) an image file is created containing that photo or video clip and
  - (b) received GPS signals are sampled and the GPS signal samples are stored with an indication of the created image file to which said GPS signal samples pertain; and
- a GPS signal processor to perform subsequent processing of the GPS signal samples to obtain a position fix and append the position fix to the image file.

8. A digital camera according to claim 7 configured to process the GPS signal samples to obtain said position fix after an intentional delay has elapsed after said GPS signal samples are stored.

9. A digital camera according to claim 7 configured to process the GPS signal samples to obtain said position fix after detecting the connection to the camera of an external power source either automatically or after user confirmation of an automatic prompt for the same.

10. A digital camera according to claim 7 configured to allow said image file creation and said GPS signal sample storing to be performed twice upon a user taking respective first and second photo or video clips prior to processing the GPS signal samples to obtain said position fix and appending the position fix to the image file of the first photo or video clip.

11. A digital camera according to claim 7 configured to upload the image file and GPS signal samples to an external computer.

12. A digital camera according to claim 11 configured to allow said image file creation and said GPS signal sample storing to be performed twice upon a user taking respective first and second photo or video clips prior to uploading the image files and GPS signal samples to said external computer.

13. A digital camera according to claim 7 wherein the GPS signal samples are stored in a file format.

14. A computer comprising a processor and receiver, and configured to:
- (a) receive through the receiver an image file containing a photo or video clip, GPS signal samples and an indication of the corresponding image file to which the GPS signal samples pertain by virtue of having been sampled when the corresponding photo or video clip was taken;
- (b) process by operation of the processor the GPS signal samples to obtain a position fix; and
- (c) append the position fix to the corresponding image file by operation of the processor.

* * * * *

UNITED STATES PATENT AND TRADEMARK OFFICE
CERTIFICATE OF CORRECTION

PATENT NO. : 7,619,662 B2 Page 1 of 1
APPLICATION NO. : 10/552049
DATED : November 17, 2009
INVENTOR(S) : Yule et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 716 days.

Signed and Sealed this

Twenty-sixth Day of October, 2010

David J. Kappos
*Director of the United States Patent and Trademark Office*

(12) EX PARTE REEXAMINATION CERTIFICATE (8759th)
United States Patent
Yule et al.

(10) Number: US 7,619,662 C1
(45) Certificate Issued: *Dec. 13, 2011

(54) METHOD OF POSITION STAMPING A PHOTO OR VIDEO CLIP TAKEN WITH A DIGITAL CAMERA

(75) Inventors: Andrew T. Yule, East Grinstead (GB); Christopher B. Marshall, Haywards Heath (GB); Simon R. Turner, Redhill (GB)

(73) Assignee: U-Blox AG, Thalwil (CH)

Reexamination Request:
No. 90/011,293, Oct. 20, 2010

Reexamination Certificate for:
Patent No.: 7,619,662
Issued: Nov. 17, 2009
Appl. No.: 10/552,049
Filed: Oct. 4, 2005

(*) Notice: This patent is subject to a terminal disclaimer.

Certificate of Correction issued Oct. 26, 2010.

(22) PCT Filed: Mar. 30, 2004

(86) PCT No.: PCT/IB2004/001000
§ 371 (c)(1),
(2), (4) Date: Oct. 4, 2005

(87) PCT Pub. No.: WO2004/090903
PCT Pub. Date: Oct. 21, 2004

(30) Foreign Application Priority Data

Apr. 8, 2003 (GB) .......................................... 0308054.6

(51) Int. Cl.
*H04N 5/76* (2006.01)

(52) U.S. Cl. .................................................. 348/231.3
(58) Field of Classification Search .................... None
See application file for complete search history.

(56) References Cited

To view the complete listing of prior art documents cited during the proceeding for Reexamination Control Number 90/011,293, please refer to the USPTO's public Patent Application Information Retrieval (PAIR) system under the Display References tab.

*Primary Examiner* — Henry N Tran

(57) ABSTRACT

A method of appending a position stamp to an image file of a photo or video clip taken with a digital camera having a GPS antenna and a GPS RF front-end including an analogue to digital converter for receiving GPS signals and outputting GPS signal samples together with a digital camera and computer for the same.

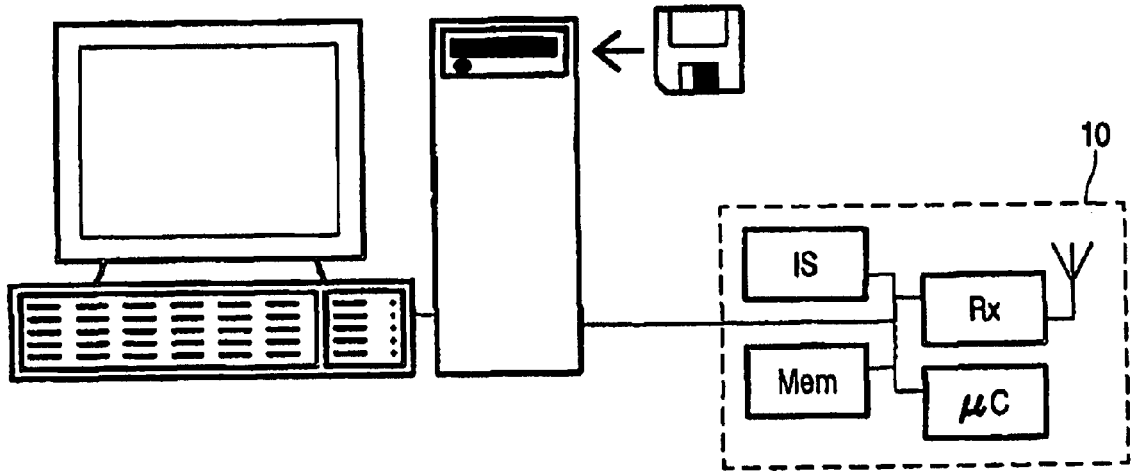

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-14 is confirmed.

* * * * *